W. J. MONAGHAN.
PORTABLE ELECTRIC LAMP.
APPLICATION FILED OCT. 27, 1913.
1,093,144.
Patented Apr. 14, 1914.
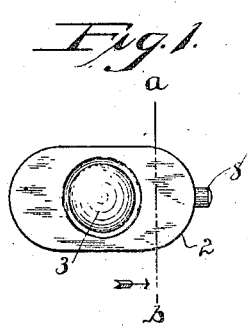
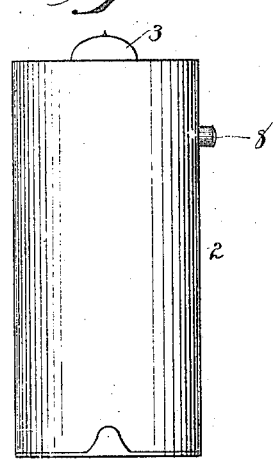
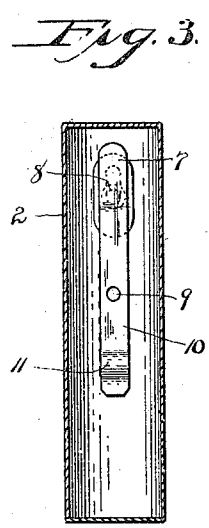
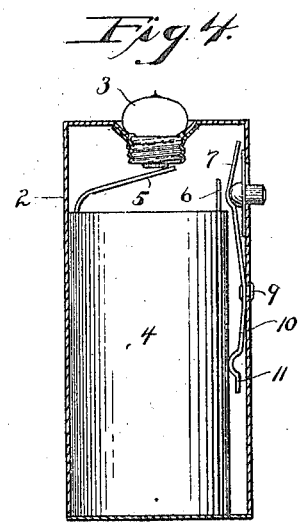

UNITED STATES PATENT OFFICE.

WILLIAM J. MONAGHAN, OF WATERBURY, CONNECTICUT, ASSIGNOR TO WATERBURY MFG. CO., OF WATERBURY, CONNECTICUT, A CORPORATION.

PORTABLE ELECTRIC LAMP.

1,093,144.  Specification of Letters Patent.  Patented Apr. 14, 1914.

Application filed October 27, 1913.  Serial No. 797,497.

*To all whom it may concern:*

Be it known that I, WILLIAM J. MONAGHAN, a citizen of the United States, residing at Waterbury, in the county of New Haven and State of Connecticut, have invented a new and useful Improvement in Portable Electric Lamps; and I do hereby declare the following, when taken in connection with the accompanying drawings and the characters of reference marked thereon, to be a full, clear, and exact description of the same, and which said drawings constitute part of this application, and represent, in—

Figure 1 a top view of a portable electric lamp constructed in accordance with my invention. Fig. 2 a side view of the same. Fig. 3 a sectional view on the line *a—b* of Fig. 1 looking in the direction of the arrow. Fig. 4 a transverse sectional view.

This invention relates to an improvement in portable electric lamps which comprises a casing in which an incandescent lamp is mounted, and into which a dry cell battery may be placed, with means for closing the circuit through the battery and lamp.

It frequently happens that the battery is considerably smaller than the case in which it is used, and if so, the circuit is apt to be accidentally closed while the device is being carried in the pocket so that the battery runs out.

The object of this invention is to provide means for holding the battery in the casing so that accidental closing of the circuit is avoided; and the invention consists in the construction hereinafter described and particularly recited in the claims.

In carrying out my invention, I employ the usual casing 2 carrying an electric lamp 3, the casing adapted to contain a dry cell battery 4 one contact arm 5 of which is always in connection with the lamp, and the other arm 6 adapted to be engaged by a spring contact 7 actuated by a button 8 projecting outward through the case and so that when the button is moved the contact spring 7 will engage with the contact 6 and close the circuit through the lamp. In order to hold the battery 4 in position and prevent the contact 6 from accidentally engaging with the spring 7, I extend the spring 7 downward below the rivet 9, by which it is secured to the casing, forming a spring arm 10 which is provided with a transverse bend 11 bearing against one side of the battery and thus holding the battery stationary in the case and preventing the contact 6 from accidentally engaging with the spring contact 7. The spring arm 10 will not interfere with the introduction or removal of the battery and prevents rattling.

I claim:—

1. A portable electric lamp comprising a casing, a spring contact riveted in one side of the casing, a button adapted to operate said spring-contact, said spring-contact extended below its rivet forming a spring arm adapted to engage with a battery introduced into the casing.

2. A portable electric lamp comprising a casing, a spring contact riveted in one side of the casing, a button adapted to operate said spring contact, said spring contact extended below its rivet forming a spring arm which is provided with a transverse bend adapted to bear against a battery introduced into the casing.

In testimony whereof, I have signed this specification in the presence of two subscribing witnesses.

WILLIAM J. MONAGHAN.

Witnesses:
A. C. RECKER,
J. S. NEAGLE.